US012552643B2

(12) United States Patent
Zhong et al.

(10) Patent No.: US 12,552,643 B2
(45) Date of Patent: Feb. 17, 2026

(54) CONTROLLING SYSTEM FOR SAFETY, A CONTROLLING METHOD FOR SAFETY, A SAFETY SWITCH AND AN ESCALATOR SYSTEM

(71) Applicant: Otis Elevator Company, Farmington, CT (US)

(72) Inventors: Haizhong Zhong, Hangzhou (CN); Huajia Guo, Tianjin (CN); Yijun Guo, Shanghai (CN)

(73) Assignee: OTIS ELEVATOR COMPANY, Farmington, CT (US)

( * ) Notice: Subject to any disclaimer, the term of this patent is extended or adjusted under 35 U.S.C. 154(b) by 15 days.

(21) Appl. No.: 18/508,855

(22) Filed: Nov. 14, 2023

(65) Prior Publication Data

US 2024/0253952 A1 Aug. 1, 2024

(30) Foreign Application Priority Data

Jan. 30, 2023 (CN) ......................... 202310087728.1

(51) Int. Cl.
*B66B 29/00* (2006.01)
*B66B 25/00* (2006.01)

(52) U.S. Cl.
CPC ............ *B66B 29/00* (2013.01); *B66B 25/003* (2013.01)

(58) Field of Classification Search
CPC ....... B66B 29/00; B66B 25/003; B66B 13/22; B66B 25/006; B66B 5/0031; B66B 29/005; B66B 25/00
See application file for complete search history.

(56) References Cited

U.S. PATENT DOCUMENTS 5,526,256 A * 6/1996 Sakata .................. B66B 29/005 700/79
6,267,219 B1 * 7/2001 Spannhake ............. B66B 27/00 198/322
8,396,588 B2 * 3/2013 Senger .................. B66B 25/006 700/230
2018/0079622 A1 * 3/2018 Sirigu ................... B66B 5/0031
2018/0314512 A1 * 11/2018 Schonauer .............. H04L 67/12
2019/0084793 A1 * 3/2019 Nakari ................. G05B 19/048
(Continued)

FOREIGN PATENT DOCUMENTS

CN 203411222 U * 1/2014
CN 113460824 A * 10/2021 ........... B66B 5/0031
(Continued)

*Primary Examiner* — Gene O Crawford
*Assistant Examiner* — Abby A Jorgensen
(74) *Attorney, Agent, or Firm* — CANTOR COLBURN LLP

(57) ABSTRACT

A safety control system includes: a plurality of safety switches connected in series to form a safety circuit; a plurality of wireless communication modules, each wireless communication module is associated with at least one of the safety switches, such that each of the wireless communication modules is configured to a signal indicating a state of a safety switch with which it is associated; and a controller including a control-site communication module, the control-site communication module configured to receive signals from the wireless communication modules, such that the controller obtains states of the safety switches based on the signals.

15 Claims, 5 Drawing Sheets

(56) References Cited

U.S. PATENT DOCUMENTS

| | | | | |
|---|---|---|---|---|
| 2021/0171320 | A1* | 6/2021 | Dong | B66B 31/02 |
| 2022/0332542 | A1* | 10/2022 | Herkel | B66B 5/02 |

FOREIGN PATENT DOCUMENTS

| | | | | | |
|---|---|---|---|---|---|
| DE | 102016102150 | A1 | * | 8/2017 | G05B 19/048 |
| EP | 3566997 | A1 | * | 11/2019 | B66B 31/00 |
| JP | 2019085184 | A | * | 6/2019 | |

* cited by examiner

CONTROLLING SYSTEM FOR SAFETY, A CONTROLLING METHOD FOR SAFETY, A SAFETY SWITCH AND AN ESCALATOR SYSTEM

FOREIGN PRIORITY

This application claims priority to Chinese Patent Application No. 202310087728.1, filed Jan. 30, 2023, and all the benefits accruing therefrom under 35 U.S.C. § 119, the contents of which in its entirety are herein incorporated by reference.

TECHNICAL FIELD

The present application relates to safety control techniques for a conveyer system, in particular to a safety control system, a safety control method, and the like.

BACKGROUND

To ensure safety in daily use, escalators are configured with a number of safety switches to detect various abnormalities. These safety switches are usually connected in series to form a safety circuit so that if any safety switch is switched off, the safety circuit will open and the escalator will stop running.

In order to learn the state of each safety switch in the safety circuit, each safety switch is connected to the control cabinet by cable so that the controller can collect the on-off state of each safety switch and determine the place where the abnormalities occur.

The escalator usually has dozens of safety switches, each of which is connected to the control cabinet by cable. Accordingly, there are dozens of cables routed from different switches of the escalator to the control cabinet. The cables are therefore numerous and disordered, which is not easy for routine maintenance.

SUMMARY

The present application provides a safety control system for a conveyer system, which comprises: a plurality of safety switches connected in series to form a safety circuit; a plurality of wireless communication modules, wherein each wireless communication module is associated with at least one of the safety switches, such that each of the wireless communication modules is capable of sending a signal indicating a state of the safety switch to which it is associated; and a controller comprising a control-site communication module, wherein the control-site communication module is used for receiving signals from the wireless communication modules, such that the controller obtains the states of the safety switches based on the signals.

According to a safety control system of the present application, additionally or as an alternative, each of the plurality of wireless communication modules is associated with one of the safety switches, and the each of the wireless communication modules is used for sending a signal to indicate that the safety switch associated is switched on when the safety switch associated is in an on state, and used for stopping sending the signal when the safety switch associated is switched off.

According to a safety control system of the present application, additionally or as an alternative, the each of the wireless communication modules is connected to a power transmission line of the safety switch associated with it to obtain power supply, such that the plurality of wireless communication modules are connected to the power transmission line of the safety circuit in parallel.

According to a safety control system of the present application, additionally or as an alternative, the plurality of safety switches are configured to have addresses that increase or decrease progressively in a single direction along the safety circuit.

According to a safety control system of the present application, additionally or as an alternative, each of the wireless communication modules is used for sending a signal indicating that the at least one of the safety switches with which it is associated is switched off in response to an off state of the at least one of safety switch associated.

According to a safety control system of the present application, additionally or as an alternative, each of the wireless communication modules is further used for being capable of forwarding signals received from other wireless communication modules of the plurality of wireless communication modules.

According to another aspect of the present application, a safety control method is also provided, which comprises: sending, by wireless communication modules associated with safety switches, signals indicating states of the safety switches associated, wherein each of the wireless communication modules is associated with at least one of the safety switches; and receiving, by a control-site communication module of a controller, the signals sent by the wireless communication modules, such that the controller obtains the states of the safety switches based on the signals.

According to a safety control method of the present application, additionally or as an alternative, each of the wireless communication modules is associated with one of the safety switches, and the sending, by wireless communication modules associated with safety switches, signals indicating states of the safety switches associated further comprises: sending, by the each of the wireless communication modules associated with one of the safety switches, a signal indicating that the safety switch associated is switched on when said safety switch associated is in an on state, and stopping, sending the signal when the safety switch associated is switched off.

According to a safety control method of the present application, additionally or as an alternative, the sending, by wireless communication modules associated with safety switches, signals indicating states of the safety switches associated further comprises: sending, by each of the wireless communication modules associated with one or more of the safety switches, a signal indicating that the at least one of the safety switches is switched off in response to an off state of the at least one of the safety switch associated.

According to a safety control method of the present application, additionally or as an alternative, each of the wireless communication modules forwards received signals upon receipt of signals from other modules of the plurality of wireless communication modules.

According to yet another aspect of the present application, a detection method for a conveyer system is further provided, the conveyer system comprising: a plurality of safety switches connected in series to form a safety circuit and a controller, wherein each of the plurality of safety switches in the safety circuit is associated with a wireless communication module; the detection method comprising: detecting whether the safety circuit is connected to a conveyer system after the conveyer system is powered on; and initiating a self-check of the safety circuit when the safety circuit is connected to the conveyer system. As an example, the initiating a self-check of the safety circuit comprises: triggering each of the safety switches in the safety circuit to determine whether feedbacks of the triggered safety switch and the wireless communication module associated with the triggered safety switch meet expected feedbacks; and completing the detection of the safety circuit when the feedbacks of each of the safety switches and the wireless communication module associated with it meet the expected feedbacks.

The present application also provides a safety switch, which comprises a wireless communication module configured to send a signal indicating a state of the safety switch.

The present application further provides an escalator system, which comprises a safety control system as described above, or the escalator system is configured to perform a safety control method as described above, or to perform a detection method as described above, or to include a safety switch as described above.

The present application herein provides a safety control system for a conveyer system, a safety control method for a conveyer system, and a detection method for a conveyer system, as an example without limitation, the conveyer system is an escalator system.

BRIEF DESCRIPTION OF THE DRAWINGS

The present application will be fully understood by referring to the detailed description of the specific embodiments below in conjunction with the accompanying drawings, where.

DETAILED DESCRIPTION

To assist those skilled in the art to gain a precise understanding of the subject matter claimed by the present application, the specific embodiments of the present application will be described in detail below in conjunction with the accompanying drawings. It should be noted that the accompanying drawings of the present application only schematically illustrate the components related to the present application and are not intended to limit the actual structure and quantity of the components.

Figure 1:
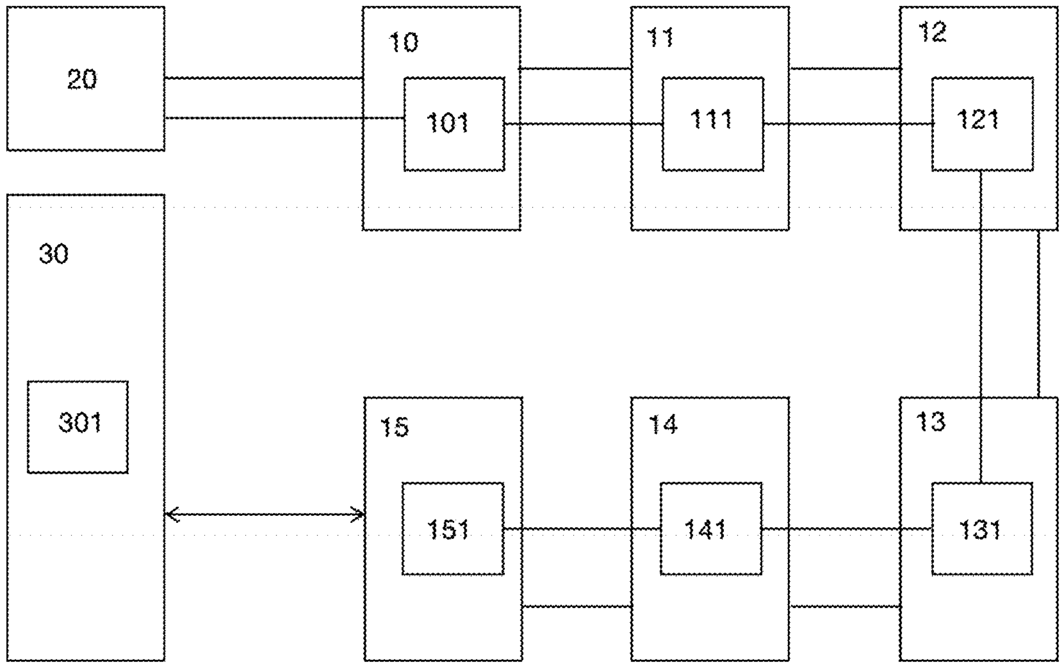
FIG. 1 is a schematic structure diagram of a safety control system for a conveyer system according to some examples of the present application.

FIG. 1 is a schematic structure diagram of a safety control system for a conveyer system according to some examples of the present application. The escalator in the various examples of the present application is used as an example of the conveyer system, but the conveyer system may be other system which is configured with a plurality of safety switches, such as an elevator.

In an escalator system, safety switches can be sensors and/or switching devices, which are generally arranged at the various safety points, at which the state of safety critical components must be monitored to avoid potential safety risks of the escalator system. These safety switches are connected in series by cables to form a safety circuit (also known as a safety chain). When an abnormality occurs at one of the safety points of the escalator, the corresponding safety switch will be switched off to disconnect the safety circuit, and the escalator will stop running to ensure safety.

As shown in FIG. 1, a safety control system comprises a plurality of safety switches connected in series to form a safety circuit, a plurality of wireless communication modules, and a controller 30. Each wireless communication module is associated with at least one safety switch to send a signal indicating the state of the safety switch with which it is associated. In this example, the safety circuit comprises a first safety switch 10, a second safety switch 11, a third safety switch 12, a fourth safety switch 13, a fifth safety switch 14, and a sixth safety switch 15 connected in series, with a power supply 20 supplying electrical power to the safety circuit. The plurality of wireless communication modules comprise a first wireless communication module 101, a second wireless communication module 111, a third wireless communication module 121, a fourth wireless communication module 131, a fifth wireless communication module 141 and a sixth wireless communication module 151, which are associated with the first safety switch 10, the second safety switch 11, the third safety switch 12, the fourth safety switch 13, the fifth safety switch 14 and the sixth safety switch 15, respectively.

In the various examples of the present application, the expression that a wireless communication module is associated with a safety switch means that the wireless communication module is set for example in the escalator system to send a signal indicating the state of the safety switch with which said wireless communication module associated, where the sent signal can indicate that the safety switch is switched on or switched off.

With continued reference to FIG. 1, the controller 30 comprises a control-site communication module 301. The control-side communication module 301 can communicate with each wireless communication module to obtain a signal indicating the state of the safety switch associated with the wireless communication module. In the various examples of the present application, the control-side communication module 301 may be based on the same communication protocol as each wireless communication module, e.g., all of them are Bluetooth-based, or zigbee-based, or Wifi-based communication modules. Alternatively, the control-side communication module 301 and the wireless communication modules may also be based on different communication protocols, in which case a signal conversion device may be provided to convert the signals into recognizable signals for each party. The controller 30 obtains the state of each safety switch according to the signal received by the control-site communication module 301.

Because the wireless communication modules which are associated with the respective safety switches communicate wirelessly with the controller, it is no longer necessary to connect cables from each safety switch to the controller. For an escalator with dozens of safety switches, the number of cables is hence significantly reduced, thus making cable routing easier and neater and avoiding safety hazards caused by too many cables.

Referring to FIG. 1, in this example, the first wireless communication module 101, the second wireless communication module 111, the third wireless communication module 121, the fourth wireless communication module 131, the fifth wireless communication module 141 and the sixth wireless communication module 151 are respectively arranged within the safety switches with which they are associated and are powered by the safety switches within which they are located. That is, the first wireless communication module 101 is arranged within and powered by the first safety switch 10, the second wireless communication module 111 is arranged within and powered by the second safety switch 11, the third wireless communication module 121 is arranged within and powered by the third safety switch 12, the fourth wireless communication module 131 is arranged within and powered by the fourth safety switch 13, the fifth wireless communication module 141 is arranged within and powered by the fifth safety switch 14, and the sixth wireless communication module 151 is arranged within and powered by the sixth safety switch 15.

Figure 1A:
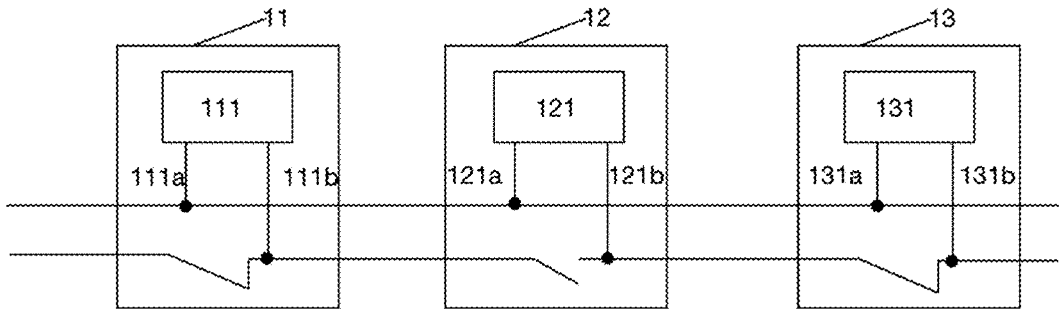
FIG. 1*a* shows the connections between the wireless communication modules and the safety switches within which they are located in FIG. 1.

FIG. 1*a* illustrates the connections between the wireless communication modules and the safety switches within which they are located in FIG. 1, taking the wireless communication module 111 and the safety switch 11 within which it is located, the wireless communication module 121 and the safety switch 12 within which it is located, and the wireless communication module 131 and the safety switch 13 within which it is located as examples. The second wireless communication module 111 is connected to the power transmission line of the second safety switch 11 via lines 111*a* and 111*b*. The third wireless communication module 121 is connected to the power transmission line of the third safety switch 12 via lines 121*a* and 121*b*. The fourth wireless communication module 131 is connected to the power transmission line of the fourth safety switch 13 via lines 131*a* and 131*b*. The remaining wireless communication modules according to the example of the present application are also connected in the same manner to the power transmission lines of the safety switches within which they are located, which are not listed in detail here one by one. The respective safety switches are connected in series, so they share the same power transmission line. By means of, for example, the connection means shown in FIG. 1*a*, the wireless communication modules arranged within the respective safety switches are connected to the power transmission line of the safety circuit in parallel with each other.

According to this example, when any safety switch in the safety circuit is switched off, the safety switch will lose power, and the wireless communication module arranged within the safety switch will also lose power. In the event of a power failure, the wireless communication module will stop sending the signal indicating the state of the safety switch with which it is associated, thereby indicating that the safety switch is switched off.

As mentioned above, when a safety point of an escalator is abnormal, the safety switch for detection of the safety point is switched off, where the abnormality can be a variety of situations that lead or may lead to escalator failure or safety events, as is commonly understood in the field. Assuming that the first safety switch 10 is used to detect component A of the escalator, then in response to component A being abnormal, the first safety switch 10 is switched off, the safety circuit is disconnected, and the escalator stops running. At the same time, the first wireless communication module 101 arranged within the first safety switch 10 stops sending the signal to the control-site communication module 301 of the controller 30 due to power interruption. According to the present application, when the first safety switch 10 is switched on, the first wireless communication module 101 can continuously send the signal indicating that the safety switch is on to the control-side communication module 301 when the first wireless communication module 101 is powered on. Therefore, once the control-side communication module 301 of the controller 30 no longer receives the signal from the first wireless communication module 101, it can be determined that the first safety switch 10 is switched off.

Figure 2:
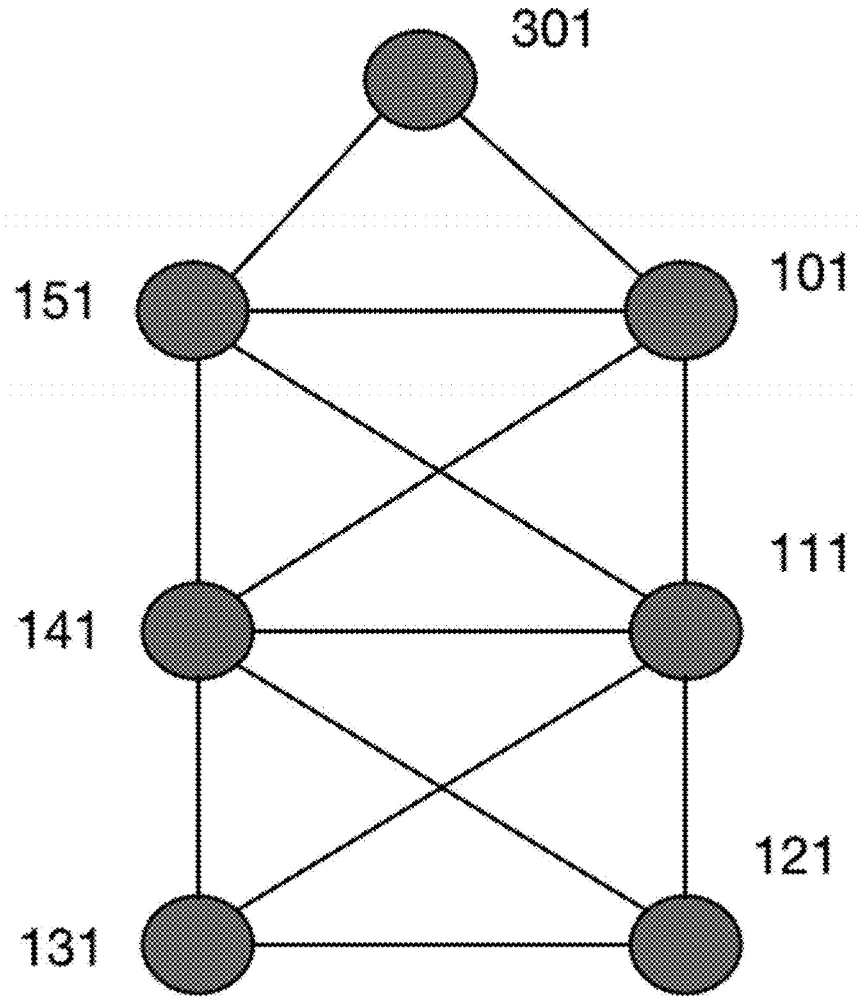
FIG. 2 shows a tree network topology of the wireless communication modules according to the examples of the present application.

FIG. 2 illustrates a tree network topology of wireless communication modules according to an example of the present application. For conciseness, in the figure, circles are used to represent the wireless communication modules of the safety switches in FIG. 1, where one circle represents a communication module, and only the reference numbers of the wireless communication modules are denoted (without text). The address of each communication module in the network topology can be used as the unique identification of each communication module. However, other information can also be used as an identification of a wireless communication module, such as an identification of a safety switch associated with the wireless communication module. The identification of the safety switch can be the identification, address, location, etc. of the safety switch in the escalator system. In cases where the safety switches and the wireless communication modules are corresponding to each other one by one, the address of the safety switch can be used as the identification of the wireless communication module. For example, in the example described above in conjunction with FIGS. 1 and 1*a*, the address of the safety switch in the safety circuit or the escalator system can be used as the identification of the wireless communication module arranged within it.

In the tree network topology, each wireless communication module can communicate with the adjacent communication module such that a signal sent by a communication module relatively farther away from the control-side communication module 301 of the controller 30 can be forwarded to the control-side communication module 301 of the controller 30 by the adjacent communication module. In case where a signal sent by a wireless communication module can be transmitted directly to the control-side communication module 301, the wireless communication module is configured to send the signal directly to the control-side communication module 301. In case where a signal sent by a wireless communication module may attenuate due to distance and thus is difficult to be transmitted directly to the control-side communication module 301, the wireless communication module may send the signal to a wireless communication module closer to the control-side communication module 301, which then forwards the signal to the control-side communication module 301.

In an example of the present application, the address of each safety switch is used as the unique identification of the wireless communication module associated with it. For example, in the safety circuit shown in FIG. 1, the addresses of the safety switches are set in an increasing or decreasing manner in a single direction of the circuit, such as in the direction of current. For example, the addresses of the first safety switch 10, the second safety switch 11, the third safety switch 12, the fourth safety switch 13, the fifth safety switch 14 and the sixth safety switch 15 are set to be 01, 02, 03, 04, 05 and 06 in turn in the direction of current. Accordingly, the identifications of the first wireless communication module 101, the second wireless communication module 111, the third wireless communication module 121, the fourth wireless communication module 131, the fifth wireless communication module 141 and the sixth wireless communication module 151 are set to be 01, 02, 03, 04, 05 and 06, respectively. The addresses of the safety switches can be configured in the controller 30 before the escalator system starts to run, so that the controller 30 can learn the specific sending party of the signal indicating the state received and learn which safety switch is switched off when the wireless communication module stops sending the signal, thereby learning which safety point is abnormal.

Figure 3:
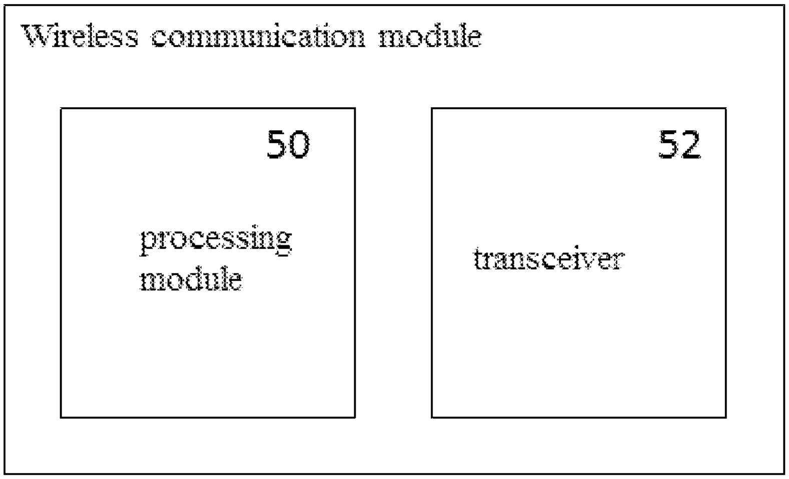
FIG. 3 is a schematic structure diagram of a wireless communication module according to an example of the present application.

FIG. 3 illustrates a structure diagram of a wireless communication module according to an example of the present application. As shown in the figure, the wireless communication module comprises a processing module 50 (e.g., a microprocessor-based control device) and a transceiver 52 (e.g., a transmitter-receiver). In an example of the present application, each wireless communication module is configured to send a state signal of the safety switch associated with it when the associated safety switch is switched on and to forward signals sent by other wireless communication modules received; whereas, when the safety switch associated with it is switched off, the wireless communication module will stop sending the signal due to power interruption. As an example, each wireless communication module is configured to continuously send the signal indicating the state of the safety switch associated with it when the associated safety switch is switched on. Alternatively, each wireless communication module is configured to send the signal indicating the state of the safety switch associated with it every T period when the associated safety switch is switched on, where the length of T can be determined according to actual needs, such as 1 second.

Referring to FIGS. 1 and 1*a*, when the respective safety points of the escalator system are normal, the corresponding safety switches are on. The wireless communication modules associated with the safety switches send signals indicating that the safety switches are on to the control-side communication module 301, respectively. In the case where a safety point in the escalator system, such as component C, is abnormal, the third safety switch 12 for detection of the abnormality of component C of the escalator is switched off, so the third wireless communication module 121 loses power after the third safety switch 12 is switched off and stops sending the signal indicating the state of the third safety switch 12. At the same time, the switch-off of the third safety switch 12 disconnects the safety circuit. For those wireless communication modules (e.g., the fourth, fifth and sixth wireless communication modules) associated with the safety switches connected in series after the third safety switch, they lose power respectively due to the loss of power on the safety switches associated with them, and are no longer capable of sending signals. However, the first wireless communication module 101 and the second wireless communication module 111 still have power supply because the switch contacts of the first safety switch 10 and the second safety switch 11 within which they are located are still on and thus can continue to send signals to the control-side communication module 301. As a result, the controller 30 can still receive signals from the first wireless communication module 101 and the second wireless communication module 111, but can no longer receive signals from the third wireless communication module 121 and the fourth, fifth and sixth wireless communication modules 131, 141 and 151, thus determining that the third safety switch 12 is switched off. It should be noted that, according to the examples of the present application, when describing a safety switch connected in series after a safety switch, "before" and "after" here are described according to, for example, a single direction of the circuit in the direction of current as mentioned above.

Likewise, if the fourth safety switch 13 is switched off, the fourth wireless communication module 131 will lose power, and power is no longer supplied to the fifth and sixth safety switches 14 and 15, so the fifth and sixth wireless communication modules 141 and 151 will lose power and stop sending signals. However, the first, second and third wireless communication modules 101, 111 and 121 still have power supply because the switch contacts of the first safety switch 10, the second safety switch 11 and the third safety switch 12 are still on and thus can continue to send signals to the control-side communication module 301 of the controller 30. As a result, in the case that signals sent by the first to third wireless communication modules can be received and signals sent by the fourth to sixth wireless communication modules cannot be received, the controller 30 can determine that the safety switch within which the fourth wireless communication module is located is switched off.

According to the above example, by arranging wireless communication modules in safety switches, connecting the respective safety switches in series, and allowing each wireless communication module to be powered by the same power supply as the safety switch within which it is located by connecting each wireless communication module to the power transmission line in the safety switch, the respective wireless communication modules are connected to the safety circuit in parallel. As a result, in the event that the safety circuit is open due to the switch-off of a safety switch, only the wireless communication module located within the safety switch and wireless communication modules located within safety switches that are arranged after the safety switch in the safety circuit will lose power, whereas the wireless communication modules located within safety switches that are before the safety switch in the safety circuit still have power supply and can still send signals to the control-side communication module. The controller can thus determine which safety switch is switched off.

In the safety control system described above in conjunction with FIG. 1, a wireless communication module is associated with a safety switch, and the wireless communication module is located within the associated safety switch. In practical applications, the wireless communication module may also be located outside the associated safety switch, in which case preferably the wireless communication module should be close to the associated safety switch, so that the wireless communication module can be connected to the power transmission line of the safety switch nearby.

According to other examples of the present application, each wireless communication module is configured to send a signal indicating that the safety switch associated with it is switched off in response to an off state of the associated safety switch. Also taking FIG. 1 as an example, for instance, the first wireless communication module 101, the second wireless communication module 111, the third wireless communication module 121, the fourth wireless communication module 131, the fifth wireless communication module 141 and the sixth wireless communication module 151 may be connected in series to form a serial circuit for communicating information to the controller in response to a state, such as the on-off of the safety circuit. Unlike the example described above in conjunction with FIG. 1 in which each wireless communication module is connected to the power transmission line of the safety switch associated with it, in this example, the respective wireless communication modules and the power supply 20 are connected in series. That is, power is supplied directly from the power supply 20 to the wireless communication modules connected in series, where it is not necessary for the wireless communication modules to receive power supply through their respective associated safety switches. In other words, from the point of view of power supply, the serial circuit formed by the communication modules connected in series is parallel to the serial circuit formed by the safety switches connected in series. In the embodiment of this example, the safety circuit includes a plurality of safety switches connected in series and a plurality of wireless communication modules connected in series.

For example, the second safety switch 11 is used to detect component B of the escalator, then in response to component B being abnormal, the second safety switch 11 is switched off and the escalator stops running. At the same time, the second wireless communication module 111 associated with the second safety switch 11 sends a signal indicating that the second safety switch 11 is switched off to the control-side communication module 301, while the second wireless communication module 111 can simultaneously send its unique identification. In this example, a sensor needs to be configured to sense the on-off state of a safety switch, and the sensed signal is transmitted to a wireless communication module associated with the safety switch, so that the wireless communication module can send a signal indicating that the safety switch is switched off to the control-side communication module 301 upon receipt of the signal indicating that the associated safety switch is off. Wherein, the sensor for sensing the state of the safety switch can be arranged within the safety switch.

In some examples of the present application, each wireless communication module is configured to forward signals only to a wireless communication module whose address is smaller and which is the adjacent node. As such, for example, the second wireless communication module 111 (address 02) only forwards state signals to the first wireless communication module 101 (address 01), while the first wireless communication module 101 forwards the state signals to the control-side communication module 301.

In other examples, each wireless communication module is configured to forward signals only to a node that is adjacent to itself and physically closer to the control-site communication module. For example, the distances between the respective nodes (i.e., the respective wireless communication modules) and the communication module of the controller illustrated in the network topology of FIG. 2 illustrate the actual physical distances. When the fourth wireless communication module 131 sends a signal indicating the state of the safety switch 13, it will send the signal containing the address simultaneously to the fifth wireless communication module 141 that is adjacent to it and closest to the control-site communication module 301. Based on the same transmission principle, the fifth wireless communication module 141 forwards the signal to the sixth wireless communication module 151, which then sends the signal to the control-side communication module 301.

According to these examples, on the one hand, the problem of not being able to transmit signals too far due to attenuation of the wireless signals is solved, and on the other hand, data blockage at the control-site wireless communication module 301 can be avoided as each wireless communication module is configured to forwarding signals in order.

In the example of sending a signal indicating that a safety switch is switched off in response to an off state of the associated safety switch as described above, a wireless communication module is associated with a safety switch, where the two are corresponding to each other. In a more specific example, the wireless communication module is located within the associated safety switch. In some alternative embodiments, a wireless communication module may be associated with two or more individual safety switches. In this way, the wireless communication module will send a signal when any of the associated safety switches is off. In some cases, the control-side communication module will further check to find the specific safety switch that is off upon receipt of a signal indicating the states of the safety switches. In some cases, the signal generated by the wireless communication module contains an identification of a specific safety switch (e.g., the address of the safety switch, etc.), so that the controller can learn which safety switch is switched off upon receipt of the signal.

Figure 4:
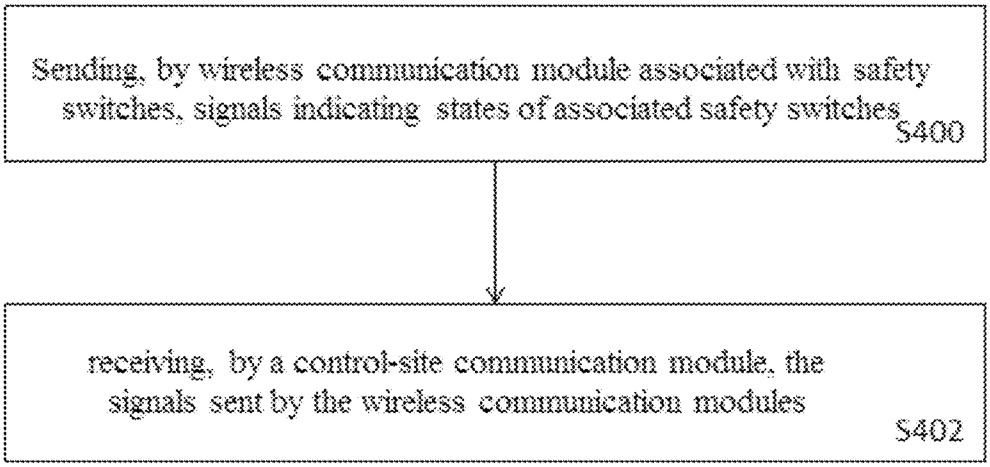
FIG. 4 is a flow chart of a safety control method for a conveyer system according to some examples of the present application.

FIG. 4 is a flow chart of a safety control method for a conveyer system according to some examples of the present application, where an escalator is an example of the conveyer system.

In step S400, wireless communication modules associated with safety switches send signals indicating the states of the associated safety switches, wherein a wireless communication module is associated with at least one of the safety switches.

In step S402, the control-side communication module of the controller receives the signals sent by the wireless communication modules, so that the controller can learn the states of the safety switches based on the signals.

The control method shown in FIG. 4 can be performed by the aforementioned safety control system, but can also be directly implemented in the escalator system. In conjunction with FIGS. 4 and 1, the first wireless communication module 101, the second wireless communication module 111, the third wireless communication module 121, the fourth wireless communication module 131, the fifth wireless communication module 141 and the sixth wireless communication module 151 send a signal to the control-site communication module 301 of the controller 30 respectively when their associated first safety switch 10, the second safety switch 11, the third safety switch 12, the fourth safety switch 13, the fifth safety switch 14 and the sixth safety switch 15 are switched on, so as to indicate that their associated safety switches are in an on state (step S400). The control-site communication module 301 of the controller 30 receives these signals (step S402) to be informed that the safety switches are on.

In some examples of performing the control method shown in FIG. 4, a wireless communication module is associated with one safety switch. In these examples, the wireless communication module associated with one safety switch sends the signal when the associated safety switch is on to indicate that said safety switch is switched on, and stops sending the signal when the associated safety switch is switched off. When the controller is unable to receive the signal sent by the wireless communication module at the control-site communication module, it can learn that the safety switch associated with the wireless communication module is switched off. This process has been described above in conjunction with FIGS. 1 and 1*a*, and in particular with the example of component C becoming abnormal, which will not be repeated here.

In some examples of performing the control method shown in FIG. 4, a wireless communication module associated with a safety switch sends a signal indicating that the safety switch is off in response to an off state of the associated safety switch. This process has been described above with the example of component B becoming abnormal, which will not be repeated here.

Further, when each safety switch is switched on, in order to avoid signal attenuation during transmission so that the signal cannot be transmitted to the controller, a wireless communication module relatively farther away from the controller will send its signal to an adjacent wireless communication module that is closer to the controller, which will then forward the signal to the controller.

Figure 5:
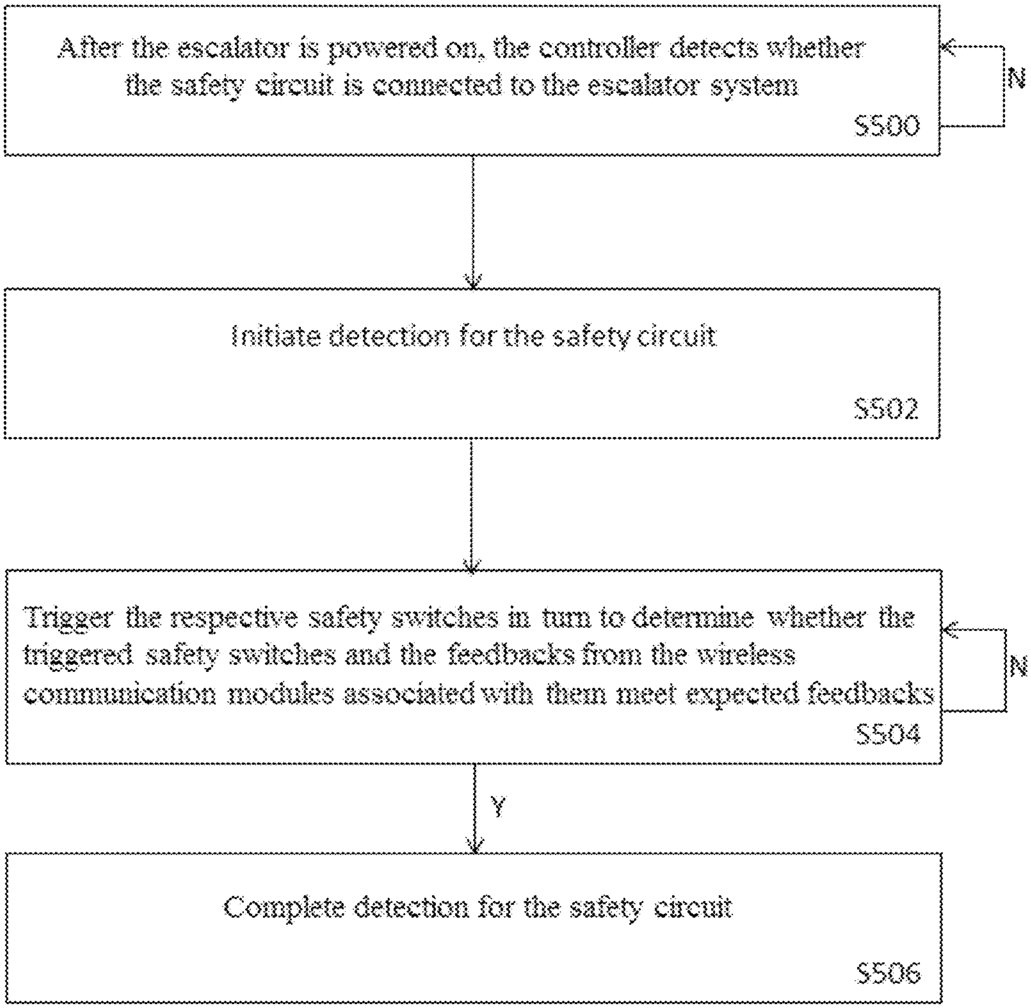
FIG. 5 is a flow chart of a detection method for a conveyer system according to some examples of the present application.

FIG. 5 is a flow chart of a detection method for a conveyer system according to the present application, in which an escalator system is taken as an example of the conveyer system and the escalator system includes the aforementioned safety control system. Before detection, the controller of the safety control system has been configured with the information of the safety switches in the safety circuit, including the number, addresses, etc., and the information of the wireless communication modules, including the association relationships between the wireless communication modules and the safety switches, the identifications (the addresses of the safety switches can be used as the identifications), and the like. In a word, in the above example in combination with a safety control system, information such as number, addresses, association relationships, etc. related to the safety switches and the wireless communication modules are configured as parameters into the controller. This detection method is intended to detect whether the safety control system can operate as described above before the escalator starts running.

As shown in the figure, in step S500, after the escalator is powered on, the controller detects whether the safety circuit is connected to the escalator system, for example, to determine whether a signal indicating power connection of the safety circuit is received or not, in particular, to determine whether each safety switch has a feedback signal indicating power connection. If so, proceed to step S502, otherwise continue to detect whether the safety circuit is connected to the escalator system.

In step S502, as a response to the safety circuit being connected to the escalator system, detection for the safety circuit is initiated, i.e., proceed to step S504.

In step S504, according to the pre-configured addresses of the safety switches, the respective safety switches are triggered in turn to determine whether the feedbacks from the triggered safety switches and the associated wireless communication modules meet the expected feedbacks. Expected feedbacks are feedbacks from the safety switches and the associated wireless communication modules when the safety switches are switched on and/or off when the safety circuit is in normal operation, where triggering here is to switch on and/or off the safety switches. Only when the feedbacks after triggering of the respective safety switches meet the expected feedbacks, can the process proceeds to step S506, otherwise continues to proceed to step S504.

In step S506, detection of the safety circuit is completed.

Although a safety control method according to the examples of the present application is described herein in conjunction with the safety control system described in FIG. 1, the safety control method can also be directly implemented by the escalator system.

The safety control method according to the examples of the present application may be implemented as a program module. When part of the program module is executed by the controller of the escalator system and the other part is executed by the wireless communication modules associated with the safety switches, the escalator system can be enabled to implement the safety control method according to the examples of the present application. The program module can be stored in a non-transient storage.

Figure 6:
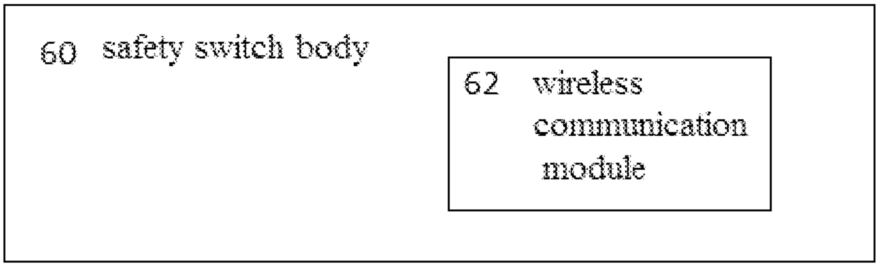
FIG. 6 is a schematic structure diagram of a safety switch according to an example of the present application.

Using the safety control system according to the present application or performing the safety control method according to the present application, it is no longer necessary for each safety switch to be connected to the controller via a separate cable. For an escalator with dozens of safety switches, this greatly reduces the number of cables used and thus saves costs. The entire escalator system and the control room become neat and easy to maintain due to the significant reduction in cables, for example, it becomes easier to move items in this space. At the same time, it also effectively avoids the situation occurring in the prior art that due to too many cables, these cables are easily to be dragged due to man-made reasons such as moving items, which would then lead to faults The present application also provides a safety switch configured with a wireless communication module. The wireless communication module is configured to send a signal indicating the state of the safety switch and to forward a received signal when the signal is received from a wireless communication module of the other safety switches. FIG. 6 is a schematic structure diagram of a safety switch. As shown, the safety switch 60 comprises a wireless communication module 62, which is, illustratively rather than restrictively, arranged in the safety switch body 60. The wireless communication module 62 is, for example, a wireless communication module described above in conjunction with the example of FIG. 1, while the safety switch 60 is, for example, a safety switch described above in conjunction with the example of FIG. 1.

The present application also provides an escalator system which may include the safety control system described herein, or may perform one of the various safety control methods described herein, or may employ the safety switches described herein.

Figure 7:
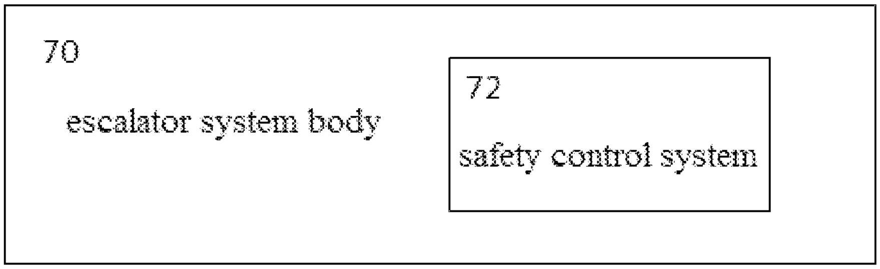
FIG. 7 is a schematic structure diagram of an escalator system according to an example of the present application.

FIG. 7 is an example of an escalator system comprising an escalator system body 70 and a safety control system 72, as illustrated in the present application. The safety control system is the safety control system described above in conjunction with the appended drawings.

Although specific embodiments of the present application have been shown and described in detail to illustrate the principle of the present application, it should be understood, however, that the present application may be implemented in other ways without departing from the principle. For example, under non-conflicting conditions, the examples described herein may be combined to form new embodiments, and so on.

What is claimed is:

1. A safety control system for a conveyer system, wherein the safety control system comprises:

a plurality of safety switches connected in series to form a safety circuit;

a plurality of wireless communication modules, wherein each wireless communication module is associated with at least one of the safety switches, such that each of the wireless communication modules is configured to send a signal indicating a state of a safety switch with which it is associated; and a controller comprising a control-site communication module, wherein the control-site communication module is configured to receive signals from the wireless communication modules, such that the controller obtains states of the safety switches based on the signals;

wherein the plurality of wireless communication modules are arranged in a tree network topology, wherein in the tree network topology each wireless communication module communicates with an adjacent wireless communication module.

2. The safety control system according to claim 1, wherein each of the plurality of wireless communication modules is associated with one of the safety switches, and the each of the wireless communication modules is used for sending, when the safety switch associated is in an on state, a signal to indicate that the safety switch associated is switched on, and for stopping sending the signal when the safety switch associated is switched off.

3. The safety control system according to claim 2, wherein the each of the plurality of wireless communication modules is connected to a power transmission line of the safety switch associated with it to obtain power supply, such that the plurality of wireless communication modules are connected in parallel to the power transmission line of the safety circuit.

4. The safety control system according to claim 3, wherein the plurality of safety switches are configured for having addresses that increase or decrease progressively in a single direction along the safety circuit.

5. The safety control system according to claim 1, wherein each of the plurality of wireless communication modules is used for sending a signal indicating that the at least one of the safety switches with which it is associated is switched off in response to an off state of the at least one of the safety switch associated.

6. The safety control system according to claim 1, wherein each of the plurality of wireless communication modules is configured to forward signals received from other wireless communication modules of the plurality of wireless communication modules.

7. The safety control system according to claim 1, wherein the conveyer system is an escalator system.

8. A safety control method for a conveyer system, wherein the safety control method comprises:

sending, by wireless communication modules associated with safety switches, signals indicating states of the safety switches associated, wherein each of the wireless communication modules is associated with at least one of the safety switches; and receiving, by a control-site communication module of a controller, the signals sent by the wireless communication modules, such that the controller is informed of the states of the safety switches based on the signals;

wherein the wireless communication modules are arranged in a tree network topology, wherein in the tree network topology each wireless communication module communicates with an adjacent wireless communication module.

9. The safety control method according to claim 8, wherein each of the wireless communication modules is associated with one of the safety switches, and the sending, by wireless communication modules associated with safety switches, signals indicating states of the safety switches associated further comprises:

sending, by the each of the wireless communication modules associated with one of the safety switches, a signal indicating that the safety switch associated is switched on when said safety switch associated is in an on state, and stopping, sending the signal when the safety switch associated is switched off.

10. The safety control method according to claim 8, wherein the sending, by wireless communication modules associated with safety switches, signals indicating states of the safety switches associated further comprises:

sending, by each of the wireless communication modules associated with one or more of the safety switches, a signal indicating that the at least one of the safety switches is switched off in response to an off state of the at least one of the safety switch associated.

11. The safety control method according to claim 8, wherein the safety control method further comprises:

forwarding, by each of the wireless communication modules, signals upon receipt of the signals from other modules of the plurality of wireless communication modules.

12. The safety control method according to claim 8, wherein the conveyer system is an escalator system.

13. A detection method for a conveyer system, the conveyer system comprising a plurality of safety switches connected in series to form a safety circuit and a controller and wireless communication modules, wherein each of the plurality of safety switches is associated with a wireless communication module; the detection method comprising:

detecting whether the safety circuit is connected to the conveyer system after the conveyer system is powered on; and initiating a detection of the safety circuit when the safety circuit is connected to the conveyer system;

wherein the wireless communication modules are arranged in a tree network topology, wherein in the tree network topology each wireless communication module communicates with an adjacent wireless communication module.

14. The detection method for a conveyer system according to claim 13, wherein the initiating a detection of the safety circuit comprises:

triggering each of the safety switches in the safety circuit to determine whether feedbacks of the triggered safety switch and the wireless communication module associated with the triggered safety switch meet expected feedbacks; and completing the detection of the safety circuit when the feedbacks of each of the safety switches and the wireless communication module associated with it meet the expected feedbacks.

15. An escalator system, wherein the escalator system comprises a safety control system including:

a plurality of safety switches connected in series to form a safety circuit;

a plurality of wireless communication modules, wherein each wireless communication module is associated with at least one of the safety switches, such that each of the wireless communication modules is configured to send a signal indicating a state of a safety switch with which it is associated; and a controller comprising a control-site communication module, wherein the control-site communication module is configured to receive signals from the wireless communication modules, such that the controller obtains states of the safety switches based on the signals;

wherein the plurality of wireless communication modules are arranged in a tree network topology, wherein in the tree network topology each wireless communication module communicates with an adjacent wireless communication module.

* * * * *